3,178,412
PROCESS FOR THE PRODUCTION OF
6β-FLUORO STEROIDS
Howard J. Ringold, Mexico City, Mexico, assignor, by mesne assignments, to Syntex Corporation, a corporation of Panama
No Drawing. Filed Nov. 30, 1959, Ser. No. 856,011
Claims priority, application Mexico, Nov. 28, 1958, 52,897; Sept. 11, 1959, 55,897
10 Claims. (Cl. 260—239.55)

This invention refers to a new process for preparing cyclopentanophenanthrene derivatives.

More particularly the present invention refers to a new process of preparing steroidal 6β-fluoro-Δ⁴-3-ketones. The latter are known to be suitable intermediates for conversion into therapeutically valuable 6α-fluoro-Δ⁴-3-ketones. Such conversion is carried out by methods known in the art, as for instance by treatment with a strong acid, preferably by treatment with gaseous hydrochloric acid in acetic acid solution.

The process of the present invention comprises in particular the step of reacting a derivative of a given ring-B-unsubstituted steroidal Δ⁴-3-ketone in which the Δ⁴ double bond has been shifted to Δ⁵ position, and preferably the 3-enolether of the aforesaid Δ⁴-3-ketone, i.e. the corresponding 3-alkoxy-Δ³,⁵-derivative of the latter, with perchloryl fluoride, $FClO_3$, commercially available under the name of "PF." This fluorinating agent attacks the aforesaid starting compound at the C-6 position.

This new reaction step may be expressed by the following generalized equation:

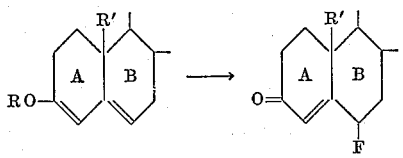

wherein R represents an alkyl, aryl or aralkyl group, and preferably an alkyl group of not more than 5 carbon atoms, and R' represents hydrogen or a methyl group. There are further used hereinafter the terms "aliphatyl" as a simple generic expression referring to alkyl, alkenyl and alkinyl radicals, "cortexone" is used for desoxycorticosterone, and "cortexolone" for Reichstein's substance S.

In practing the process outlined in the preceding equation the starting steroidal Δ³,⁵-compound, preferably the 3-enolether is dissolved in an organic solvent inert in the reaction, such as benzene, aqueous buffered acetone, chloroform, dioxane, toluene, xylene, anisol, ethyl ether, or, preferably, an organic amide either alone or in mixture with a tertiary amine. Typical suitable organic amides are dimethylformamide and dimethylacetamide; suitable tertiary amines are, for instance, pyridine or γ-collidine. After the starting compound has been completely dissolved in the aforesaid inert solvent, perchloryl fluoride is bubbled through the solution in a slow current and the reaction mixture is worked up by conventional methods, for instance, in the case of water-miscible solvents the mixture is poured into water and the desired product is isolated by extraction with the aid of a conventional organic solvent followed by crystallization or chromatography, over a suitable adsorbent such as alumina or silica.

The reaction conditions may vary within wide limits. Satisfactory yields were obtained, when varying the reaction time between 5 minutes and 20 hours and/or varying the reaction temperature between —60° C. and +60° C. Preferred reaction times are from 5 minutes to 3 hours and the preferred temperature range is —20° to +20° C. Surprisingly, we have found that none of the usual substituents at the positions C-2, C-9, C-11, C-16 and C-17, commonly known and used in the steroid art, interferes with this reaction, even where these substituents or substituent groupings should per se be capable of reacting with perchloryl fluoride. This process step is thus of a general character and may be applied for preparing 6β-fluoro-Δ⁴-3-ketones of the following general formula

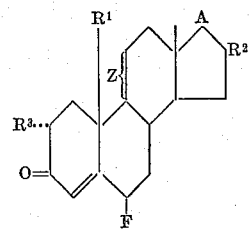

which may be subsequently isomerized to the therapeutically valuable 6α-fluoro-Δ⁴-3-ketones.

In the preceding formula R¹ represents hydrogen or a methyl group; R² represents hydrogen, α-hydroxy, α-acyloxy, α-alkoxy, α-methyl, β-methyl; R³ represents hydrogen or a lower alkyl group; Z is an arrangement comprising C-9 and C-11 selected from the group consisting of a single bond between said C-9 and C-11 free from substituents, a double bond between said C-9 and C-11, and a single bond between C-9 and C-11 with the substituents 11α-hydroxy, 11β-hydroxy, 11α-acyloxy, 11-keto, 9α-fluoro-11β-hydroxy-9α-chloro-11β-hydroxyl, 9α-bromo-11β-hydroxy, 9α-fluoro-11-keto, 9α-chloro-11-keto, and 9α-bromo-11-keto, where R¹ is methyl, and Z is the first aforesaid member of said group where R¹ is hydrogen; and A represents the typical androstane or pregnane substituents, and is more specifically selected from the group consisting of oxygen, β-hydroxy, β-acyloxy, α-aliphatyl-β-hydroxy, α-aliphatyl-β-acyloxy, β-acetyl, β-hydroxyacetyl, β-acyloxyacetyl, α-hydroxy-β-acetyl, α-acyloxy-β-acetyl, α-hydroxy-β-hydroxyacetyl, α-hydroxy-β-acyloxyacetyl, α-acyloxy-β-acyloxyacetyl, β-fluoroacetyl, and α-acyloxy-β-fluoroacetyl; the aforesaid aliphatyl radicals being selected from the group of alkyl, alkenyl and alkinyl and having up to 5 carbon atoms.

The unsaturated bond of the alkenyl groups may be in the vicinal position or further away with respect to C-17; the hydrocarbons from which the aforesaid aliphatyl and alkoxy groups derive may be of straight or branched chain, which may be further substituted with functional groups; the aforesaid acyloxy groups are derived from hydrocarbon carboxylic acids which are saturated or unsaturated, of straight, branched, cyclic or mixed straight-cyclic or branched-cyclic chain, optionally substituted with functional groups; these functional groups may be such as hydroxyl, acyloxy as set forth above, alkoxy of 1 to 5 carbon atoms or halogen (F, Cl or Br); typical aliphatyl radicals at C-17α are the methyl, ethyl, propyl, vinyl, propenyl, butenyl, ethinyl, propinyl and butinyl groups; typical esters formed with acyloxy radicals described above are the acetates, propionates, butyrates, hemisuccinate, enanthate, caproate, benzoate, trimethylacetate, phenoxyacetate, phenylpropionate and β-chloropropionate; the 16α,17α-dihydroxy compounds comprised by the above general formula may be converted to their cyclic ketals and acetals.

The therapeutically valuable 6α-fluoro-Δ⁴-3-ketones that may be obtained by inversion of the 6β-fluoro-Δ⁴-

3-ketones prepared in accordance with the present invention have been claimed in U.S. applications 740,550, 749,652, 753,629, 762,232, 775,397, 789,242, 792,962, 792,963, 792,964, 792,990, 804,153, 806,761, 807,772 807,774, 819,545, 820,589, and 825,664.

Among these compounds, the following particularly useful ones were for instance, obtained by the process according to the present invention: the 6α-fluoro-derivatives of progesterone, of 17α-hydroxyprogesterone, of 17α-acetoxyprogesterone, of cortexone, of cortexolone, of cortisone and hydrocortisone, of their esters and their substituted derivatives in accordance with the formula set forth above.

An 11-hydroxyl group present in C-9-unsubstituted starting compounds is conveniently protected by formation of the 11-formate or the 11-trifluoroacetate before carrying out the above described process step according to the invention.

The 3-enolethers used as starting compounds in the above reaction equation were obtained by conventional methods, preferably by treating the Δ⁴-3-ketones in dioxane solution with triesters of orthoformic acid preferably the ethyl orthoformate and in the presence of p-toluenesulfonic acid. By this method there were prepared, for example, the 3-enolethers of testosterone, 19-nor-testosterone and their 17α-aliphatyl-derivatives and esters. (In order to esterify a testosterone substituted at C-17α, the same was heated in pyridine solution with the respective acid anhydride at 90° C. for a period of between 12 and 96 hours.) The 20-keto-21-hydroxy-pregnane compounds were preferably esterified at C-21 prior to enolization. In the case of 17α-hydroxy-20-keto-pregnanes the 3-enolethers may be prepared and used indistinctly either with the free or the esterified 17α-hydroxy-group; thus, for example, the potent hormone 6α-fluoro-17α-acetoxy-progesterone may be prepared either by converting 17α-acetoxyprogesterone into its 3-enol-ether, followed by reaction with perchloryl fluoride to yield the 6β-fluoro-17α-acetoxyprogesterone, and inversion to the 6α-compound, or by first forming the 3-enol-ether of 17α-hydroxyprogesterone, fluorination and inversion of the steric configuration of the fluorine atom introduced at C-6 and finally 17-acetylation of the resulting 6α-fluoro-17α-hydroxyprogesterone.

To obtain 6α-fluoro derivatives of compounds possessing the dihydroxyacetone side chain it is convenient to start with the aforesaid 3-enolethers of their 21-mono-acetates; thus, for instance the 3 enoletherwas prepared from the 21-acetate of 16β-methyl-9α-fluoro-cortisone; subsequent fluorination, inversion at C-6 and finally hydrolysis of the 21-acetoxy group yielded 16β-methyl-6α, 9α-difluoro cortisone. Optionally, both the 17- and the 21-hydroxy group of such 17α-hydroxy-21-acetoxy-20-keto-pregnanes may be esterified before forming the enol-ether; thus, for example, the 21-acetate of 16α-methyl-9α-fluoro-cortisone was converted into its diacetate by the method of Turner (J. Am. Chem. Soc., 75, 3489 (1953)), the reaction of this diacetate with perchloryl fluoride afforded the diacetate of 16α-methyl-6β,9α-difluoro-cortisone, which was then treated with dry hydrogen chloride to convert 6β-fluorine to 6α-fluorine, and finally the acetate groups were hydrolyzed. Instead of the diacetate, other diesters either with the same radicals such as the dipropionate, or with different radicals, such as the acetate-propionate may be subjected to the above mentioned enolization at C-3. Similarly 3-enoletherswere prepared from the 17,21-diesters of the 16α- and 16β-methyl-derivatives of cortexolone, of cortisone and of 9α-fluoro-cortisone, as well as from the 16,17,21-tri-esters of 16α-hydroxy-cortisone and of 9α-fluoro-16α-hydroxy-cortisone. In all such cases, fluorination of the enolethers, inversion and final saponification yielded the 6α-fluoro-Δ⁴-3-ketones, with their free hydroxy groups at C-17 and C-21 (and C-16 respectively).

The following examples serve to illustrate but are not intended to limit the scope of the invention:

Example I

The 3-ethylenolether of 17α-ethinyl-19-nor-testosterone was prepared to serve as a starting material for this example, from a mixture of 1 g. of 17α-ethinyl-nor-testosterone, 10 cc. of dioxane, 1 cc. of ethyl orthoformate and 100 mg. of p-toluenesulfonic acid monohydrate. The mixture was stirred at a temperature of about 25° C. for 2 hours; 5 cc. of pyridine was added and the mixture was then slowly treated under stirring with ice water until precipitation of the reaction product was complete. The mixture was kept for 2 hours in the refrigerator and the precipitate was collected, washed with water and dried. By recrystallization from acetone-hexane there was obtained 3 - ethoxy-17α-ethinyl-19-nor-Δ³,⁵-androstadien-17β-ol, i.e. the 3-ethylenolether of 17α-ethinyl-19-nor-testosterone.

A slow stream of perchloryl fluoride was introduced into a solution of 5 g. of the 3-ethylenolether of 17α-ethinyl-19-nor-testosterone in 500 cc. of benzene free of thiophene, maintaining the temperature between 18 and 22° C., until 1.2 molar equivalents of the reagent had been absorbed. The mixture was then kept at room temperature for 15 minutes, washed with saturated aqueous sodium bicarbonate solution and water, dried over anhydrous sodium sulfate and the benzene was evaporated under reduced pressure. By chromatography of the residue on silica gel there was obtained 6β-fluoro-17α-ethinyl-19-nor-testosterone.

A slow stream of dry hydrogen chloride was introduced for 2 hours into a solution of 1 g. of 6β-fluoro-17α-ethinyl-19-nor-testosterone in 50 cc. of glacial acetic acid, maintaining the temperature below 18° C. After pouring into 500 cc. of ice water the precipitate formed was collected by filtration, washed to neutral, dried and recrystallized from acetone, thus yielding 6α-fluoro-17α-ethinyl-19-nor-testosterone.

Example II

A solution of 1 g. of the ethylenolether of testosterone described by Serini et al. in "Ber." 71, p. 1766 (1938), in 30 cc. of acetone and 3 cc. of water was cooled to 0° C., treated with 300 mg. of sodium acetate and 0.3 cc. of glacial acetic acid and then a slow stream of perchloride fluoride was introduced into the mixture until 1.5 molar equivalents of the reagent had been absorbed. The mixture was kept for 2 hours at 0° C., then diluted with ice water and the precipitate was collected, washed with water, dried and purified by chromatography on silica gel. There was thus obtained 6β-fluoro-testosterone, M.P. 169–171° C., [α]$_D$ ±0°, λ$_{max}$ 234 mμ, ε=10.600.

By the method of inversion with hydrogen chloride described in Example I there was obtained 6α-fluoro-testosterone.

Example III

In order to prepare as starting material the 3-ethyl-enolether of cortisone 21-acetate, a mixture of 1 g. of cortisone 21-acetate, 10 cc. of dioxane, 1 cc. of ethyl orthoformate and 100 mg. of p-toluenesulfonic acid monohydrate was stirred for 2 hours at 25° C.; 5 cc. of pyridine were added and then, little by little and under stirring, chilled water until precipitation was complete. The mixture was kept under refrigeration for 2 hours, the precipitate was filtered, washed with water and dried. Crystallization in acetone-hexane yielded 3-ethoxy-Δ³,⁵-pregnadien-17α,21-diol-11,20-dione 21-acetate, i.e. the desired enol-ether.

The latter compound was then treated according to the invention with perchloryl fluoride as described in Example I and there was obtained 6β-fluoro- and after inversion with hydrogen chloride 6α-fluoro-cortisone 21-acetate.

Example IV

By following the method of enolization described in

Example I, the 16,21-diacetate of 9α-fluoro-16α-hydroxy-cortisol was converted into its 3-ethylenolether.

One gram of this 3-ethylenolether of 9α-fluoro-16α-hydroxy-cortisol 16,21-diacetate is dissolved in 25 cc. of dimethylformamide, and the solution is cooled to 0° C. A stream of perchloryl fluoride is then passed through the solution for about 5 minutes, whereupon the solution is heated to 20° C. and poured into water. The mixture is then extracted with ethyl acetate, the extract is washed with a saturated aqueous solution of sodium bicarbonate, and then with water to neutral, dried over anhydrous sodium sulfate and the solvent evaporated. Chromatography of the residue over washed alumina and elution with ether then leads to the isolation of the 6α- and the 6β - stereoisomers of 6,9α - difluoro-16α-hydroxy-cortisol 16,21-diacetate with the 6β-isomer predominating in the mixture. The latter isomer is dissolved in 50 cc. of glacial acetic acid and a stream of dry hydrogen chloride is passed through the solution for 24 hours, at temperatures in the vicinity of 15° C. The mixture is then poured into ice water, the formed solids filtered off, washed with water, dried, and crystallized from acetone-hexane, whereby an additional amount of 6α,9α-difluoro-16α-hydroxy-cortisol 16,21-diacetate is obtained.

*Example V*

The reaction described in the preceding example was carried out in the presence of 2.5 cc. of pyridine, and at —60° C. The crude product (without isolation of the stereoisomers) was then treated with hydrogen chloride in acetic acid in anhydrous conditions, exactly as described in the preceding example; crystallization from acetone hexane afforded the 16,21-diacetate of 6α,9α-difluoro-16α-hydroxy cortisol, identical to the final compound of the preceding example.

*Example VI*

The 3-ethylenolether of 17α-ethinyl-19-nor-testosterone acetate was prepared as a starting material for this example as follows:

A solution of 2 g. of 17α-ethinyl-19-nor-testosterone in 10 cc. of pyridine was heated for 12 hours at 90° C. with 4 cc. of acetic anhydride. After pouring into water the mixture was heated for half an hour on the steam bath, cooled and the precipitate was collected by filtration, washed with water, dried and recrystallized from acetone-hexane, thus giving the 17α - ethinyl - 19 - nor-testosterone acetate.

A mixture of 1 g. of the above compound, 10 cc. of dioxane, 1 cc. of ethyl orthoformate and 100 mg. of p-toluenesulfonic acid monohydrate was stirred for 2 hours at a temperature around 25° C.; 5 cc. of pyridine was added and the mixture was then treated as described for the free compound in Example I. There was ultimately obtained the acetate of 3-ethoxy-17α-ethinyl-19-nor-Δ$^{3,5}$-androstadien-17β-ol (3-ethylenolether of 17α-ethinyl-19-nor-testosterone acetate).

Further treatment of this enolether by the method described in Example IV yielded 6β- and finally 6α-fluoro-17α-ethinyl-19-nor-testosterone acetate.

*Example VII*

A mixture of 5 g. of the 21-acetate of 16α-methyl-9α-fluoro-cortisone, 5 g. of p-toluenesulfonic acid monohydrate, 250 cc. of glacial acetic acid and 50 cc. of acetic anhydride was kept overnight at room temperature and then poured into ice water. The precipitate was collected by filtration, washed with water, dried and purified by chromatography on neutral alumina, thus affording 16α-methyl-9α-fluoro-cortisone diacetate.

3 g. of the above compound was treated with 4 cc. of propyl orthoformate, essentially following the procedure of enolization described in Example I, to produce 16α - methyl - 9α - fluoro - 3 - propoxy - Δ$^{3,5}$ - pregnadiene - 17α,21 - diol - 11,20 - dione diacetate, i.e. the 3-propylenolether of 16α-methyl-9α-fluoro-cortisone diacetate.

Treatment of the latter compound with perfluoryl chloride as described in Example IV yields first 16α-methyl-6β,9α-difluoro-cortisone diacetate and finally 16α-methyl-6α,9α-difluoro-cortisone diacetate.

*Example VIII*

A solution of 1 g. of 16α-methyl-6β,9α-difluoro-cortisone diacetate prepared as described in the preceding example, in 50 cc. of 0.2% methanolic solution of potassium hydroxide was kept for one hour under an atmosphere of nitrogen at 0° C.; it was then acidified with acetic acid, concentrated to a small volume, diluted with water and the precipitate was collected, washed with water, dried and crystallized from acetone-hexane. There was thus obtained the free 16α-methyl-6β,9α-difluoro-cortisone.

*Example IX*

By following the method of enolether formation described in Example VII, there was prepared the 3-propylenolether of cortisone diacetate from the 21-acetate of cortisone, described by Sarett et al. in J. Am. Chem. Soc. 70, 1454 (1948) and 71, 2443 (1949).

This 3-propylenolether compound is then treated with perfluoryl chloride as described in Example IV and there is obtained 6β-fluoro-cortisone diacetate (M.P. 214°–216° C., [α]$_D$ +62°, λ$_{max}$ 232–234 mμ; ε=11.480). A small amount of 6α-fluoro-cortisone diacetate is also obtained and separated from the 6β-stereoisomer by chromatography as described in Example IV. The 6β-stereoisomer is converted to the 6α-isomer by treatment with dry hydrogen chloride as described in the last mentioned example.

*Example X*

A solution of 5 g. of the 21-propionate of 16β-methyl-cortexolone in 100 cc. of benzene was treated with 10 g. of cyclopentylpropionic anhydride and 2 g. of p-toluenesulfonic acid monohydrate and kept at room temperature for 24 hours. The solution was then washed with 5% aqueous sodium bicarbonate solution and water to neutral, dried over anhydrous sodium sulfate, the benzene was evaporated and the residue was chromatographed on neutral alumina thus furnishing the 17-cyclopentylpropionate 21-propionate of 16β-methyl-cortexolone.

By enolether formation in accordance wtih the method of Example I there was then obtained the 3-ethynolether of this compound. By treatment of the latter ester with perfluoryl chloride according to Example IV there were obtained 6β- and 6α-fluoro-16β-methyl-cortexolone 17-cyclopentylpropionate 21-propionate.

*Example XI*

Example VII is repeated with the 21-acetate of 16α-hydroxy-9α-fluoro-cortisone as the starting compound. There is first prepared the 16,21-diacetate of the latter, then the 3-propylenolether, and finally 6α,9α- and 6β,9α-difluoro-16α-hydroxy-cortisone 16,21-diacetate.

*Example XII*

By following the method of acetylation described in Example VII, the 16,21-diacetate of 9α - fluoro - 16α-hydroxy-cortisone was converted into the 16,17,21-triacetate. In accordance with the method of Example I there was then prepared the 3-ethylenolether of this triacetate.

Treatment of the latter compound with perfluoryl chloride as described in Example IV yielded 6α,9α- and 6β,9β-difluoro-16α-hydroxy-cortisone 16,17,21-triacetate.

*Example XIII*

By using in the method of enolether formation of Example III, methyl orthoformate instead of ethyl orthoformate the 3-methyl enolether of cortisone 21-acetate was obtained.

Further treatment as described in Example III, yielded the same 6β- and 6α-fluoro-cortisone 21-acetates.

*Example XIV*

The 3-ethylenolether of the 21-acetate of 16α-methylcortisone, which acetate is described by Arth et al. in J. Am. Chem. Soc. 80, 3160 (1958), was prepared by the method described in Example III.

1 g. of the 3-enolether of 16α-methyl-cortisone acetate was treated with perchloryl fluoride at 20° C. during 15 minutes and following the method as described in Example IV; a mixture of 6α- and 6β-isomers of the 21-acetate of 16α-methyl-6-fluoro-cortisone were thus obtained. After treatment with anhydrous hydrogen chloride in glacial acetic acid the steric configuration of the 6β-isomer was inverted to afford finally the 21-acetate of 16α-methyl-6α-fluoro-cortisone.

*Example XV*

The 3-methyl enolether of 9α-fluoro-16α-hydroxy-cortisol 21-acetate 16,17-acetonide, described by Fried et al. in J. Am. Chem. Soc. 80, 2338 (1958), is produced by the step of enolether formation described in Example XIII.

A mixture of 1 g. of the 3-methylenolether of the 21-acetate of the 16,17-acetonide of 9α-fluoro-16α-hydroxy-cortisol, 45 cc. of dimethylacetamide and 4 cc. of pyridine was treated with a stream of perchloryl fluoride for 15 minutes at −60° C.; it was then warmed to room temperature and kept standing for 2 hours, at the end of which the mixture was poured into water and the solid was collected, consisting of the 21-acetate of the acetonide of 6,9α-difluoro-16α-hydroxy-cortisol. The total crude compound was treated at 0° C. with 50 cc. of acetone saturated with hydrogen chloride for 8 hours; it was then diluted with water and the precipitate was collected, washed with water, dried and recrystallized from acetone-hexane, thus giving the 21-acetate of the acetonide of 6α,9α-difluoro-16α-hydroxy-cortisol.

*Example XVI*

The 3-ethylenolether of 9α-fluoro-cortisone 21-acetate is produced by the step of enolether formation described in Example III.

A slow stream of perchloryl fluoride was introduced for half an hour into a solution of 1 g. of the 21-acetate of the 3-ethylenolether of 9α-fluoro-cortisone in 40 cc. of dimethylformamide and 2 cc. of γ-collidine cooled at −20° C. The mixture was then poured into ice water and the product isolated as described in Example IV, to first produce a mixture of the 6α- and 6β-isomers of the 21-acetate of 6,9α-difluoro-cortisone and then invert the 6β-isomer to the 6α-isomer.

*Example XVII*

In accordance with the method of enolether formation described in Example I, there is prepared the 3-ethyl-enolether of progesterone from the latter steroid.

1 g. of the 3-ethylenolether of progesterone was dissolved in 46 cc. of dimethylformamide and 4 cc. of pyridine and a slow stream of perchloryl fluoride was introduced at 20° C. for 20 hours. The mixture was poured into ice water, extracted several times with methylene chloride and the extract was washed with 5% aqueous sodium carbonate solution, then with water to neutral and the solvent was evaporated; the residue was chromatographed on 30 g. of washed alumina to isolate as main product 6β-fluoro-progesterone, M.P. 159–161°, $[\alpha]_D$ +104° (chloroform), $\lambda_{max}$ 234–236 mμ; ε=11,000, and also a small amount of 6α-fluoro-progesterone. The 6β-isomer was treated with dry hydrogen chloride in glacial acetic acid (compare Example IV) to form 6α-fluoro-progesterone.

*Example XVIII*

The preceding example is repeated using 17α-acetoxy-progesterone as the initial material. There was obtained via the 3-ethylenolether of the latter first 6β-fluoro-17α-acetoxy-progesterone (M.P. 207–208° C., $[\alpha]_D$ −18° (chloroform), $\lambda_{max}$ 232–234 mμ; ε=13,000; and after inversion with hydrogen chloride 6α-fluoro-17α-acetoxy-progesterone.

*Example XIX*

A mixture of 2 g. of the 21-acetate of cortisol, 12 cc. of anhydrous dioxane and 4.8 cc. of trifluoroacetic anhydride was stirred at room temperature for 18 hours and poured into a mixture of ice and water. The product was extracted with 4 portions of methylene dichloride and the extract was washed with water to neutral, dried over anhydrous sodium sulfate and evaporated to dryness. Trituration of the residue with ether gave the crude 11-trifluoroacetate-21-acetate of cortisol. Chromatography on alumina and further recrystallization from acetone-hexane afforded the pure 11-trifluoroacetate 21-acetate of cortisol; M.P. 206–207° C.; $[\alpha]_D$ +165.7 (chloroform), $\lambda_{max}$ 238–240 mμ; log ε=4.17.

A mixture of 2 g. of the 11-trifluoracetate-21-acetate of cortisol, 24 cc. of anhydrous dioxane, 2 cc. of ethyl orthoformate and 80 mg. of p-toluenesulfonic acid was stirred at room temperature until all of the solid went into solution and then the mixture was kept standing for a further half hour. It was then poured into water, cooled and extracted with methylene dichloride; the extract was washed with water, dried over anhydrous sodium sulfate and evaporated to dryness. The oily residue consisted of the 11-trifluoroacetate 21-acetate of 3-ethoxy-$\Delta^{3,5}$-pregnadiene-11β,17α,21-triol-20-one in crude form; $[\alpha]_D$ ±0° (chloroform); $\lambda_{max}$ 240–2 mμ, log ε=4.15; it was used without further purification.

The last mentioned compound was treated with perchloryl fluoride as described in Example XIV and there was obtained 6β-fluoro-cortisol 11-trifluoroacetate 21-acetate. Inversion with hydrogen chloride as described in Example IV followed by saponification as described in Example VIII yielded the free 6α-fluoro-cortisol via the 11-trifluoroacetate thereof.

*Example XX*

The 3-enolether of cortexone acetate was prepared by the enolether formation step of Example III, as a starting material for this example. This enolether, 3-ethyloxy-$\Delta^{3,5}$-pregnadien-21-ol-20-one acetate, was then treated with perchloryl fluoride as described in Example IV and afforded 6β-fluoro-cortexone acetate (M.P. 152–154°; $[\alpha]_D$ +87° (chloroform); $\lambda_{max}$ 234 mμ; ε=10000). Inversion with hydrogen chloride yielded 6α-fluoro-cortexone acetate.

*Example XXI*

By essentially following the procedure of enolization of Example III, but substituting the triethyl ester of orthoformic acid by the tribenzyl ester of this acid the 21-acetate of cortexone was converted into its 3-benzylenolether.

3-benzylenolether of cortexone acetate, upon treatment with perchloryl fluoride as described in Example IX yielded 6β-fluoro-cortexone acetate as an intermediate identical with the 6β-fluoro intermediate of Example XX, and 6α-fluoro cortexone acetate as final product. Saponification according to Example VIII yielded the free 6α- and 6β-fluoro cortexones.

*Example XXII*

A mixture of 5 g. of the 21-acetate of cortexolone acetate, 5 g. of p-toluenesulfonic acid monohydrate, 250 cc. of glacial acetic acid and 50 cc. of acetic anhydride was kept overnight at room temperature and then poured into ice water. The precipitate was collected by filtration, washed with water, dried and purified by chromatography on neutral alumina, thus affording the 3-enolether of cortexolone diacetate, i.e. 3-ethyloxy-17α,21-bis-acetoxy-$\Delta^{3,5}$-pregnadien-20-one.

The latter was then treated according to the fluorination step of Example XVII and afforded 6β-fluoro-Δ⁴-pregnene-17α,21-diol-3,20-dione, i.e. 6β-fluoro-cortexolone diacetate (M.P. 188–190° C.; [α]_D −14° (chloroform); λ_max 234–236 mμ, ε=9750).

A solution of 1 g. of 6β-fluoro-cortexolone diacetate in 50 cc. of 0.2% methanolic solution of potassium hydroxide was kept for one hour under an atmosphere of nitrogen at 0° C.; it was then acidified with acetic acid, concentrated to a small volume, diluted with water and the precipitate was collected, washed with water, dried and crystallized from acetone-hexane. There was thus obtained the free 6β-fluoro-Δ⁴-pregnene-17α,21-diol-3,20-dione, M.P. 222–224° C., [α]_D +25° (chloroform), λ_max 234–236 mμ, ε=10,050.

Inversion with hydrogen chloride as described in Example I yielded 6α-fluoro cortexolone diacetate and free 6α-fluoro-cortexolone respectively.

*Example XXIII*

By the method of enolization described in Example I there was prepared the 3-ethylenolether of 17α-methyl-testosterone. The fluorination method described in Example IV was then applied to the latter compound and there was obtained as an intermediate 6β-fluoro-17α-methyl-testosterone, and as the final product by inversion with hydrogen chloride 6α-fluoro-17α-methyl-testosterone.

*Example XXIV*

By the method of enolization described in Example I there was prepared the 3-ethylenolether of Δ⁴-androstene-3,17-dione. The fluorination method described in Example IV was then applied to the latter compound and there was obtained as an intermediate 6β-fluoro-Δ⁴-androstene-3,17-dione, and as the final product by inversion with hydrogen chloride 6α-fluoro-Δ⁴-androstene-3,17-dione.

*Example XXV*

By the method of Example I the 21-acetate of 16α-hydroxy-cortexolone was converted into the corresponding 3-ethylenolether. The latter is converted by the further method steps described in Example IV to 6β-fluoro- and finally 6α-fluoro-16α-hydroxy-Δ⁴-pregnene-17α,21-diol-3,20-dione 21-acetate, i.e. 6β-fluoro cortexolone 21-acetate and 6α-fluoro cortexolone 21-acetate.

*Example XXVI*

The preceding example is repeated, but with 16β-methyl-cortexolone 21-acetate used for the enolization step, and there are obtained the 6β-fluoro- and 6α-fluoro-16β-methyl-cortexolone 21-acetates.

*Example XXVII*

The preceding example is repeated, but with 16α-methyl-cortexolone 21-acetate used for the enolization step, and there are obtained the 6β-fluoro- and 6α-fluoro-16α-methyl-cortexolone 21-acetates.

*Example XXVIII*

Example XXVII is repeated, however, in accordance with the enolether method described in Example XIII, the 3-methylenolether of 16α-methyl-cortexolone 21-acetate was first prepared and used as starting compound in the subsequent fluorination treatment according to Example IV. The final products were identical with those obtained in Example XXVII.

*Example XXIX*

Example XVII is repeated with 19-nor-progesterone, and there are obtained via the 3-ethylenolether of the latter 6β-fluoro- and 6α-fluoro-19-nor-progesterone.

*Example XXX*

Following the procedure of Example IV, there was further prepared from the compounds listed under I via the 3-ethylenolethers of the same. The 6α- and 6β-fluoro derivatives listed under II:

| I | II |
|---|---|
| 9α-fluoro-cortisol 21-acetate | 6α,9α-difluoro and 6β,9α-difluoro cortisol acetate. |
| 16α-hydroxy-9α-fluoro-cortisol 21-acetate. | 6α,9α-difluoro and 6β,9α-difluoro-16α-hydroxy-cortisol 21-acetate. |
| 16α-methyl-cortisol 21-acetate | 6α and 6β-fluoro-16α-methyl-cortisol 21-acetate. |
| 9α-chloro-cortisone 21-acetate | 6α and 6β-fluoro-9α-chloro-cortisone 21-acetate. |
| 9α-chloro-cortisol 21-acetate | 6α and 6β-fluoro-9α-chloro-cortisol 21-acetate. |
| 9α-bromo-cortisone 21-acetate | 6α and 6β-fluoro-9α-bromo-cortisone 21-acetate. |
| 9α-bromo-cortisol 21-acetate | 6α and 6β-fluoro-9α-bromo-cortisol 21-acetate. |
| 11α-epi-cortisol 11,21-diacetate | 6α and 6β-fluoro-11α-epi-cortisol 11,21-diacetate. |
| 2α-methyl-testosterone | 6α and 6β-fluoro-2α,17α-dimethyl-testosterone. |
| 2α,17α-dimethyl-testosterone | 6α and 6β-fluoro-2α,17α-dimethyl-testosterone. |
| 17α-methyl-testosterone | 6α and 6β-fluoro-17α-methyl-testosterone. |
| Δ⁴,⁹⁽¹¹⁾-pregnadien-16α,17α,21-triol-3,20-dione 16,21-diacetate. | 6α and 6β-fluoro-Δ⁴,⁹⁽¹¹⁾-pregnadien-16α,17α,21-triol-3,20-dione 16,21-diacetate. |
| Δ⁴,⁹⁽¹¹⁾-pregnadien-17α,21-diol-3,20-dione 21-acetate. | 6α and 6β-fluoro-Δ⁴,⁹⁽¹¹⁾-pregnadien-17α,21-diol-3,20-dione 21-acetate. |
| 16α-methyl-Δ⁴,⁹⁽¹¹⁾-pregnadien-17α,21-diol-3,20-dione 21-acetate. | 6α and 6β-fluoro-16α-methyl-Δ⁴,⁹⁽¹¹⁾-pregnadien-17α,21-diol-3,20-dione 21-acetate. |

What is claimed is:

1. A process for producing steroidal 6β-fluoro-Δ⁴-3-ketones comprising the step of reacting a 3-alkoxy-Δ³,⁵-diene being an alkyl enolether of a steroid Δ⁴-3-ketone unsubstituted in ring B with perchloryl fluoride in an organic solvent inert to this reaction.

2. The method of claim 1 in which the solvent is selected from the group consisting of chloroform, dioxane, benzene, toluene, xylene, anisol dimethylformamide, dimethylacetamide and aqueous buffered acetone.

3. A process as described in claim 1, wherein the perchloryl fluoride is introduced into a solution of said starting diene in said organic solvent for from about 5 minutes to about 20 hours.

4. A process as described in claim 3, wherein the solution during the introduction of the perchloryl fluoride is maintained at a temperature between −60° C. and +60° C.

5. The method in accordance with claim 1 wherein the starting diene is an alkyl enolether derived from a compound belonging to the Δ⁴-androstene series.

6. The method in accordance with claim 1 wherein the starting diene is derived from the 19-nor-Δ⁴-androstene series.

7. The method in accordance with claim 1 wherein the starting diene is an alkyl enolether derived from a compound belonging to the Δ⁴-pregnene series.

8. The method in accordance with claim 1 wherein the starting diene is derived from the 19-nor-Δ⁴-pregnene series.

9. A process for the production of a Δ⁴-3-keto-6β-fluoro steroid which comprises reacting the 3-enol ether of a Δ⁴-3-keto steroid with perchloryl fluoride in the presence of a tertiary amine.

10. A process for the production of a Δ⁴-3-keto-6β-fluoro steroid which comprises reacting the 3-enol ether of a Δ⁴-3-keto steroid with perchloryl fluoride in the presence of an inert solvent.

References Cited in the file of this patent

Chem. and Eng. News, volume 37, No. 39, page 51 (Sept. 28, 1959).

Nakanishi et al.: J.A.C.S., volume 81, pages 5259–60 (Oct. 5, 1959).

Bloom et al.: Chem. and Industry, page 1317 (Oct. 17, 1959).